(12) United States Patent
Sokolov et al.

(10) Patent No.: US 7,543,288 B2
(45) Date of Patent: Jun. 2, 2009

(54) REDUCED INSTRUCTION SET FOR JAVA VIRTUAL MACHINES

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1436 days.

(21) Appl. No.: 09/819,120

(22) Filed: Mar. 27, 2001

(65) Prior Publication Data

US 2002/0194243 A1    Dec. 19, 2002

(51) Int. Cl.
- *G06F 9/455* (2006.01)
- *G06F 15/00* (2006.01)
- *G06F 9/44* (2006.01)

(52) U.S. Cl. .......................... 718/1; 712/200; 717/100
(58) Field of Classification Search ......... 718/100–104, 718/1; 712/200; 717/100
See application file for complete search history.

(56) References Cited

U.S. PATENT DOCUMENTS

| | | | |
|---|---|---|---|
| 4,199,811 A | 4/1980 | Borgerson et al. | |
| 4,667,290 A | 5/1987 | Goss et al. | |
| 4,910,731 A | 3/1990 | Sakurai et al. | |
| 5,418,964 A | 5/1995 | Conner et al. | |
| 5,542,059 A | 7/1996 | Blomgren | |
| 5,815,718 A | 9/1998 | Tock | |
| 5,838,980 A | 11/1998 | Guillen et al. | |
| 5,872,978 A | 2/1999 | Hoskins | |
| 5,893,084 A | 4/1999 | Morgan et al. | |
| 5,899,997 A | 5/1999 | Ellacott | |
| 5,903,761 A | 5/1999 | Tyma | |
| 5,920,720 A | 7/1999 | Toutonghi et al. | |
| 5,970,242 A | 10/1999 | O'Connor et al. | |
| 5,978,585 A | 11/1999 | Crelier | |
| 6,003,038 A | 12/1999 | Chen | |

(Continued)

FOREIGN PATENT DOCUMENTS

EP    0810522 A2    12/1997

(Continued)

OTHER PUBLICATIONS

Lindholm et al, "The Java™ Virtual Machine Specification", (Sep. 1996), Sun Microsystems, Inc., Chapters 1-10 (173 pp.).

(Continued)

*Primary Examiner*—Meng-Al T. An
*Assistant Examiner*—Camquy Truong
(74) *Attorney, Agent, or Firm*—Beyer Weaver & Thomas, LLP

(57) ABSTRACT

Techniques for implementing virtual machine instructions suitable for execution in virtual machines are disclosed. The inventive virtual machine instructions can effectively represent the complete set of operations performed by the conventional Java Bytecode instruction set. Moreover, the operations performed by conventional instructions can be performed by relatively fewer inventive virtual machine instructions. Thus, a more elegant, yet robust, virtual machine instruction set can be implemented. This, in turn, allows implementation of relatively simpler interpreters as well as allowing alternative uses of the limited 256 ($2^8$) Bytecode representation (e.g., a macro representing a set of commands). As a result, the performance of virtual machines, especially, those operating in systems with limited resources, can be improved by using the inventive virtual machine instructions.

20 Claims, 14 Drawing Sheets

U.S. PATENT DOCUMENTS

| | | | |
|---|---|---|---|
| 6,026,485 A | 2/2000 | O'Connor et al. | |
| 6,047,125 A | 4/2000 | Agesen et al. | |
| 6,072,951 A | 6/2000 | Donovan et al. | |
| 6,072,953 A | 6/2000 | Cohen et al. | |
| 6,075,942 A * | 6/2000 | Cartwright, Jr. | 717/138 |
| 6,081,665 A | 6/2000 | Nilsen et al. | |
| 6,096,095 A | 8/2000 | Halstead | |
| 6,101,580 A | 8/2000 | Agesen et al. | |
| 6,118,940 A * | 9/2000 | Alexander et al. | 717/127 |
| 6,151,618 A | 11/2000 | Wahbe et al. | |
| 6,151,703 A | 11/2000 | Crelier | |
| 6,163,780 A | 12/2000 | Ross | |
| 6,182,202 B1 | 1/2001 | Muthukkaruppan | |
| 6,202,208 B1 | 3/2001 | Holiday, Jr. | |
| 6,205,578 B1 | 3/2001 | Grove | |
| 6,223,202 B1 * | 4/2001 | Bayeh | 718/102 |
| 6,260,187 B1 | 7/2001 | Cirne | |
| 6,292,883 B1 | 9/2001 | Augusteijn et al. | |
| 6,317,872 B1 | 11/2001 | Gee et al. | |
| 6,330,709 B1 * | 12/2001 | Johnson et al. | 717/100 |
| 6,332,215 B1 | 12/2001 | Patel et al. | |
| 6,338,160 B1 | 1/2002 | Patel et al. | |
| 6,339,841 B1 | 1/2002 | Merrick et al. | |
| 6,349,377 B1 * | 2/2002 | Lindwer | 712/22 |
| 6,372,286 B1 | 4/2002 | Azuma et al. | |
| 6,374,286 B1 * | 4/2002 | Gee et al. | 718/108 |
| 6,412,108 B1 | 6/2002 | Blandy et al. | |
| 6,427,228 B1 | 7/2002 | Wigger | |
| 6,434,625 B1 | 8/2002 | Loen | |
| 6,434,694 B1 | 8/2002 | Slaughter et al. | |
| 6,442,753 B1 | 8/2002 | Gerard et al. | |
| 6,446,084 B1 | 9/2002 | Shaylor et al. | |
| 6,446,254 B1 | 9/2002 | Chapman et al. | |
| 6,477,702 B1 | 11/2002 | Yellin et al. | |
| 6,496,871 B1 | 12/2002 | Jagannathan et al. | |
| 6,553,565 B2 | 4/2003 | Click, Jr. et al. | |
| 6,557,023 B1 | 4/2003 | Taivalsaari | |
| 6,557,054 B2 | 4/2003 | Reisman | |
| 6,571,388 B1 | 5/2003 | Venkatraman et al. | |
| 6,584,612 B1 | 6/2003 | Mueller et al. | |
| 6,643,711 B2 | 11/2003 | Bracha et al. | |
| 6,658,421 B1 | 12/2003 | Seshadri | |
| 6,684,394 B1 | 1/2004 | Shann | |
| 6,704,803 B2 | 3/2004 | Wilson et al. | |
| 6,704,923 B1 | 3/2004 | Gosling | |
| 6,738,977 B1 | 5/2004 | Berry et al. | |
| 6,851,108 B1 | 2/2005 | Syme et al. | |
| 6,851,111 B2 | 2/2005 | McGuire et al. | |
| 2002/0046298 A1 | 4/2002 | Bak et al. | |
| 2002/0170041 A1 | 11/2002 | Shann | |
| 2002/0170043 A1 | 11/2002 | Bagley et al | |
| 2002/0188726 A1 | 12/2002 | Schick et al. | |

FOREIGN PATENT DOCUMENTS

| | | |
|---|---|---|
| EP | 0943989 A2 | 9/1999 |
| EP | 0 996 059 A2 | 4/2000 |
| WO | WO99/18484 | 4/1999 |
| WO | WO99/31576 | 6/1999 |
| WO | WO99/61981 | 12/1999 |
| WO | WO01/22213 A2 | 3/2001 |
| WO | WO02/41145 A2 | 5/2002 |
| WO | WO02/077807 A1 | 10/2002 |

OTHER PUBLICATIONS

McNeley KJ et al., "Emulating a Complex Instruction Set Computer With a Reduced Instruction Set Computer," IEEE Micro, IEEE Inc. New York, US, vol. 7, No. 1, Feb. 1987, pp. 60-71.

Jean-Paul Billon, "JEFFWEG4 (J Executable File Format), Release 1.0 Achievements, Sep. 29, 2000," J Consortium Jeff Working Group, 'Online! Feb. 22, 2001, p. 1-24.

Jean-Paul Billon, "J Executable File Format (JEFF) Specification, Draft," J Consortium Jeff Working Group, 'Online! Feb. 22, 2001, p. 1-43.

Lambright H D, "Java Bytecode Optimizations" Proceedings of IEEE Compcon '97. San Jose, Feb. 23-26, 1997, pp. 206-210, XP-000751784.

Accomazzo E et al., "Integrating intermediate Code Optimization with Retargetable Code Generation" Microprocessing and Microprogramming, Elsevier Science Publishers, BV. Amsterdam, NL, vol. 30, No. 1/5, Aug. 1, 1990, pp. 475-481, XP000141684.

Tim Ritchey, "Java!" 1995, New Riders Publishing, pp. 326-343.

John Meyer & Troy Downing, "Java Virtual Machine," 1997, O'Reilly & Associates, Inc. pp. 46, 56-57, 74-75, 389 and 391.

Microsoft Press Computer Dictionary Third Edition, pp. 294-295.

Chang et al., "EJVM: an economic Java run-time environment for embedded devices," Software Practice & Experience, 2001, John Wiley & Sons, Ltd., vol. 31, pp. 129-146. XP-000987539.

Gosling et al., "The Java™ Language Specification", Aug. 1, 1996, pp. 215-236. XP 002042923.

Zhenyu Qian, "A formal Specification of Java™ Virtual Machine Instructions," Technical Report, University Bremen; Nov. 1997, pp. 1-32. XP-002255760.

Piumarta et al., "Optimizing Direct Threaded Code by Selective Inlining," Association for Computing Machinery, vol. 33, No. 5, pp. 291-300, May 1, 1998.XP-000766278.

Examination Report dated Aug. 8, 2005 from the corresponding GB Application No.: GB0324568.5, 5 pages.

Patrice Pominville, "Annotating Java Bytecode," Project Report, McGill University, Online, April 2000, pp. 1-7. XP-002254149.

Yourst, "Inside Java Class Files," Dr. Dobbs's Journal, Jan. 1998, XP-002254150.

Hummel et al., "Annotating the Java bytecodes in support of optimization," Concurrency: Practice and Experience, John Wiley and Sons, vol. 9(11), Nov. 1997, pp. 1003-1016. XP-001131083.

Lindholm et al., "The Java Virtual Machine Specification," Second Edition, Apr. 1999, pp. 117-132. XP-002254151.

Dahm, Markus, "Byte Code Engineering", 1999, Java Information Tag, Proceedings of JIT' 99: Java-Informations'Tage, Dusseldorf, Germany, vol. 20-21, pp. 267-277, XP-002262007.

Bill Venners, "How the Java virtual machine handles method invocation and return" Java World, Jun. 1997, pp. 1-10.

Clausen et al., "Java Bytecode Compression for Low-End Embedded Systems," May 2000, ACM.

Goldberg, "A specification of java loading and bytecode verification," ACM, pp. 49-58, 1998.

Chang et al. "Type based verification of assembly language for compiler degugging," ACM TLDI, pp. 91-102, Jan. 2005.

Qian et al., "A formal specification of Java class loading," ACM OOPSLA, pp. 325-336, 2000.

Krintz et al., "Reducing transfer delay using java class file splitting and prefetching," ACM OOPSLA, pp. 276-291 Nov. 1999.

Chilimbi et al., "Cache-Conscious Structure Definition", p. 13-24, 1999 ACM.

Nicol et al., "Empirical Study of parallel Trace-Driven LRU Cache Simulators", p. 166-169, 1995 IEEE.

Office Action of Aug. 2, 2004 by Examiner Ali for U.S. Appl. No. 09/920,097, entitled *Enhanced Virtual Machine Instruction.s*".

\* cited by examiner

| OP_PUSHL |
|---|
| lconst_0 |
| lconst_1 |
| dconst_0 |
| dconst_1 |
| ldc2_w |

PUSHB
| aconst_null |
| iconst_m1 |
| iconst_0 |
| iconst_1 |
| iconst_2 |
| iconst_3 |
| iconst_4 |
| iconst_5 |
| bipush |

| LOAD |
|---|
| iload |
| fload |
| aload |
| iload_0 |
| iload_1 |
| iload_2 |
| iload_3 |
| fload_1 |
| fload_2 |
| fload_3 |
| aload_0 |
| aload_1 |
| aload_2 |
| aload_3 |

| LOADL |
|---|
| lload |
| dload |
| lload_0 |
| lload_1 |
| lload_2 |
| lload_3 |
| fload_0 |
| dload_0 |
| dload_1 |
| dload_2 |
| dload_3 |

Fig. 5B    Fig. 5C

| lcmp | OP_LSUB, OP_JMPEQ |
|---|---|
| fcmpl | OP_FSUB, OP_JMPLE |
| fcmpg | OP_FSUB, OP_JMPGE |
| dcmpl | OP_DCMP, OP_JMPLE |
| dcmpg | OP_DCMP, OP_JMPGE |

Fig. 6F

| if_icmpeq | OP_ISUB, OP_JMPEQ |
|---|---|
| if_icmpne | OP_ISUB, OP_JMPNE |
| if_icmplt | OP_ISUB, OP_JMPLT |
| if_icmpge | OP_ISUB, OP_JMPGE |
| if_icmpgt | OP_ISUB, OP_JMPGT |
| if_icmple | OP_ISUB, OP_JMPLE |
| if_acmpeq | OP_ISUB, OP_JMPEQ |
| if_acmpne | OP_ISUB, OP_JMPNE |

Fig. 6G

| RETURN |
|---|
| Ireturn |
| Freturn |
| Areturn |

Fig. 8A

| LRETURN |
|---|
| Lreturn |
| Dreturn |

Fig. 8B

| NEW |
|---|
| New |
| Newarray |
| Anewarray |
| Multianewarray |

Fig. 9

REDUCED INSTRUCTION SET FOR JAVA VIRTUAL MACHINES

CROSS-REFERENCE TO RELATED APPLICATIONS

This application is related to pending U.S. patent application Ser. No. 09/820,097, entitled "ENHANCED VIRTUAL MACHINE INSTRUCTIONS", filed on an even date, and hereby incorporated herein by reference for all purposes.

This application is related to pending U.S. patent application Ser. No. 09/703,361, entitled "IMPROVED FRAMEWORKS FOR INVOKING METHODS IN VIRTUAL MACHINES", which is hereby incorporated herein by reference for all purposes.

This application is related to pending U.S. patent application Ser. No. 09/703,356, entitled "IMPROVED METHODS AND APPARATUS FOR NUMERIC CONSTANT VALUE INCLINING IN VIRTUAL MACHINES", which is hereby incorporated herein by reference for all purposes.

This application is related to pending U.S. patent application Ser. No. 09/703,449, entitled "IMPROVED FRAMEWORKS FOR LOADING AND EXECUTION OF OBJECT-BASED PROGRAMS", which is hereby incorporated herein by reference for all purposes.

BACKGROUND OF THE INVENTION

The present invention relates generally to object-based high level programming environments, and more particularly, to virtual machine instruction sets suitable for execution in virtual machines operating in portable, platform independent programming environments Recently, the Java™ programming environment has become quite popular. The Java™ programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries, together constitute a Java™ runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification, on any computer that is able to run an implementation of the Java™ runtime environment. A class written in the Java programming language is compiled to a particular binary format called the "class file format" that includes Java virtual machine instructions for the methods of a single class. In addition to the Java virtual machine instructions for the methods of a class, the class file format includes a significant amount of ancillary information that is associated with the class. The class file format (as well as the general operation of the Java virtual machine) is described in some detail in *The Java Virtual Machine Specification* by Tim Lindholm and Frank Yellin (ISBN 0-201-31006-6), which is hereby incorporated herein by reference.

Conventional virtual machines interpreter decodes and executes the Java Bytecode instructions, one instruction at a time during execution, e.g., "at runtime." To execute a Java instruction, typically, several operations have to been performed to obtain the information that is necessary to execute the Java instruction. For example, to invoke a method referenced by a Java bytecode, the virtual machine must perform several operations to access the Constant Pool simply to identify the information necessary to locate and access the invoked method.

As described in *The Java Virtual Machine Specification*, one of the structures of a standard class file is known as the "Constant Pool." The Constant Pool is a data structure that has several uses. One of the uses of the Constant Pool that is relevant to the present invention is that the Constant Pool contains the information that is needed to resolve various Java Instructions. To illustrate, FIG. 1 depicts a conventional computing environment 100 including a stream of Java Bytecodes 102, a constant pool 104 and an execution stack 106. The stream of Java Bytecodes 102 represents a series of bytes in a stream where one or more bytes can represent a Java Bytecode instruction. For example, a byte 108 can represent a Ldc (load constant on the execution stack) Bytecode command 108. Accordingly, the bytes 110 and 112 represent the parameters for the Ldc Bytecode command 108. In this case, these bytes respectively represent a CP-IndexA 100 and CP-IndexB 112 that collectively represent the index to appropriate constant value in the constant pool 104. For example, bytes C1, C2, C3 and C4 of the constant pool 104 can collectively represent the appropriate 4 byte (one word) constant C that is to loaded to the top of the execution stack 106. It should be noted that Ldc Bytecode command 108 and its parameters represented by bytes 110 and 112 are collectively referred to herein as a Java Bytecode instruction.

In order to execute the Java Bytecode Ldc Instruction 108, at run time, an index to the Constant Pool 104 is constructed from the CP-IndexA and CP-IndexA. Once an index to the Constant Pool has been determined, the appropriate structures in the Constant Pool have to be accessed so that the appropriate constant value can be determined. Accordingly, the Java Bytecode Ldc instruction can be executed only after performing several operations at run time. As can be appreciated from the example above, the execution of a relatively simple instruction such as loading a constant value can take a significant amount of run time. Hence, this conventional technique is an inefficient approach that may result in significantly longer execution times.

Another problem is that the conventional Java Bytecode instruction set has more than 220 instructions. Moreover, there is a significant amount of redundancy between some instructions in the conventional Java Bytecode instruction set. For example, there are different Java Bytecode instructions for storing (or pushing) integer local variables on the execution stack (e.g., iLoad), and storing (or pushing) a pointer local variable on the execution stack (e.g., aLoad). However, the operations performed by these instructions are virtually identical, namely, storing (or pushing) 4 byte values (a word) on the execution stack. There is also a significant amount of overlap between some instructions of the conventional Java Bytecode instruction set. For example, there are 5 different Java Bytecode instructions for pushing one byte integer values on the execution stack (i.e., iconst_1, iconst_2, iconst_3, iconst_4 and iconst_5). However, these operations virtually perform the same operations, namely, pushing a constant one byte integer value on the execution stack.

As noted above, the Java Bytecode instruction set has more than 220 instructions. This means that conventionally nearly all of the 256 ($2^8$) allowable Bytecode values have to be assigned to Java instructions (commands or opcodes). As a result, Java interpreters are needlessly complex since they need to recognize a relatively large number of Java instructions and possibly implement various mechanisms for executing many instructions. Thus, the conventional Java Bytecode instruction set is not a very desirable solution for systems with limited resources (e.g., embedded systems)

Accordingly, there is a need for alternative instructions suitable for execution in virtual machines.

SUMMARY OF THE INVENTION

To achieve the foregoing and other objects of the invention, techniques for implementing virtual machine instructions suitable for execution in virtual machines are disclosed. The inventive virtual machine instructions can effectively represent the complete set of operations performed by the conventional Java Bytecode instruction set. Moreover, the operations performed by conventional instructions can be performed by relatively fewer inventive virtual machine instructions. Furthermore, the inventive virtual machine instructions can be used to perform operations that cannot readily be performed by conventional Java Bytecode instructions. Thus, a more elegant yet robust virtual machine instruction set can be implemented. This in turn allows implementation of relatively simpler interpreters as well as allowing alternative uses of the limited 256 ($2^8$) Bytecode representation (e.g., a macro representing a set of commands). As a result, the performance of virtual machines, especially, those operating in systems with limited resources, can be improved.

The invention can be implemented in numerous ways, including a system, an apparatus, a method or a computer readable medium. Several embodiments of the invention are discussed below.

As a set of virtual machine instructions suitable for execution in a virtual machine, one embodiment of the invention provides a set of virtual machine instructions representing a number of corresponding Java Bytecode executable instructions that are also suitable for execution in the virtual machine. The set of the virtual machine instructions consists of a number of virtual machine instructions which is less than the number of the corresponding Java Bytecode executable instructions. In addition, every one of the corresponding Java Bytecode executable instructions can be represented by at least one of the virtual machine instructions in the virtual machine instruction set.

As a method of converting a set of Java Bytecode executable instructions into a set of executable virtual machine instructions, one embodiment of the invention includes the acts of: receiving one or more bytes representing a Java Bytecode instruction suitable for execution in a virtual machine; selecting a corresponding virtual machine instruction. The corresponding virtual machine instruction are suitable for execution in the virtual machine and represent one or more operations that can be performed when the Java Bytecode instruction is executed. In addition, the virtual machine instruction can represent at least two or more Java Bytecode executable instructions such that operations that can be performed by executing the at least two or more Java Bytecode executable instructions can be performed by execution of the virtual machine instruction.

As a Java Bytecode instruction translator, one embodiment of the invention operates to convert a set of Java Bytecode executable instructions suitable for execution on a virtual machine into a set of corresponding executable virtual machine instructions. The corresponding virtual machine instructions are also suitable for execution in the virtual machine and represent operations that can be performed by execution of a number of corresponding Java Bytecode instructions. In addition, the corresponding set of the virtual machine instructions consists of a number of virtual machine instructions that is less than the number of the corresponding Java Bytecode executable instructions.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5B illustrates a set of Java Bytecode instructions for loading 4 byte local variables that can be represented by an inventive Load command in accordance with one embodiment of the invention.

FIG. 5C illustrates a set of Java Bytecode instructions for loading 8 byte local variables in accordance with one embodiment of the invention.

FIGS. 8A and 8B illustrate mapping of Java Bytecode return instructions to virtual machine instructions provided in accordance with one embodiment of the invention.

FIG. 9 illustrates a mapping of Java Bytecode instantiation instructions to the virtual machine instructions provided in accordance with one embodiment of the invention

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to improve performance in Java compliant virtual machines.

To achieve this and other objects of the invention, techniques for implementing virtual machine instructions suitable for execution in virtual machines are disclosed. The inventive virtual machine instructions can effectively represent the complete set of operations performed by the conventional Java Bytecode instruction set. Moreover, the operations performed by conventional instructions can be performed by relatively fewer inventive virtual machine instructions. Furthermore, the inventive virtual machine instructions can be used to perform operations that cannot readily be performed by the conventional Java Bytecode instructions. Thus, a more elegant yet robust virtual machine instruction set can be implemented. This, in turn, allows implementation of relatively simpler interpreters as well as allowing for alternative uses of the limited 256 ($2^8$) Bytecode representation (e.g., a macro representing a set of commands). As a result, the performance of virtual machines, especially, those operating in systems with limited resources, can be improved.

Embodiments of the invention are discussed below with reference to FIGS. 2–9. However, those skilled in the art will readily appreciate that the detailed description given herein with respect to these figures is for explanatory purposes only as the invention extends beyond these limited embodiments.

Figure 1:
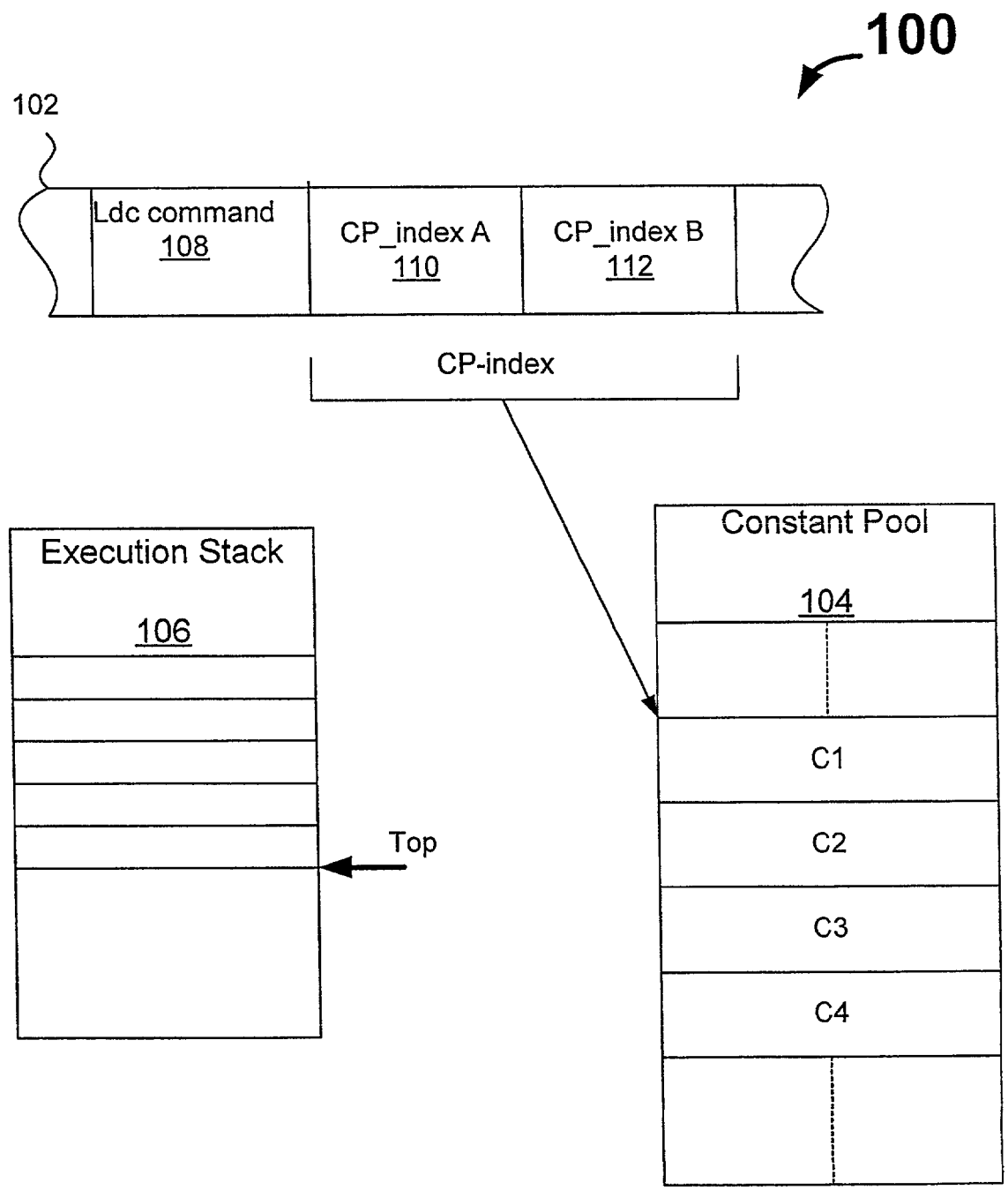
FIG. 1 depicts a conventional computing environment including a stream of Java Bytecodes, a constant pool, and an execution stack.
Figure 2A:
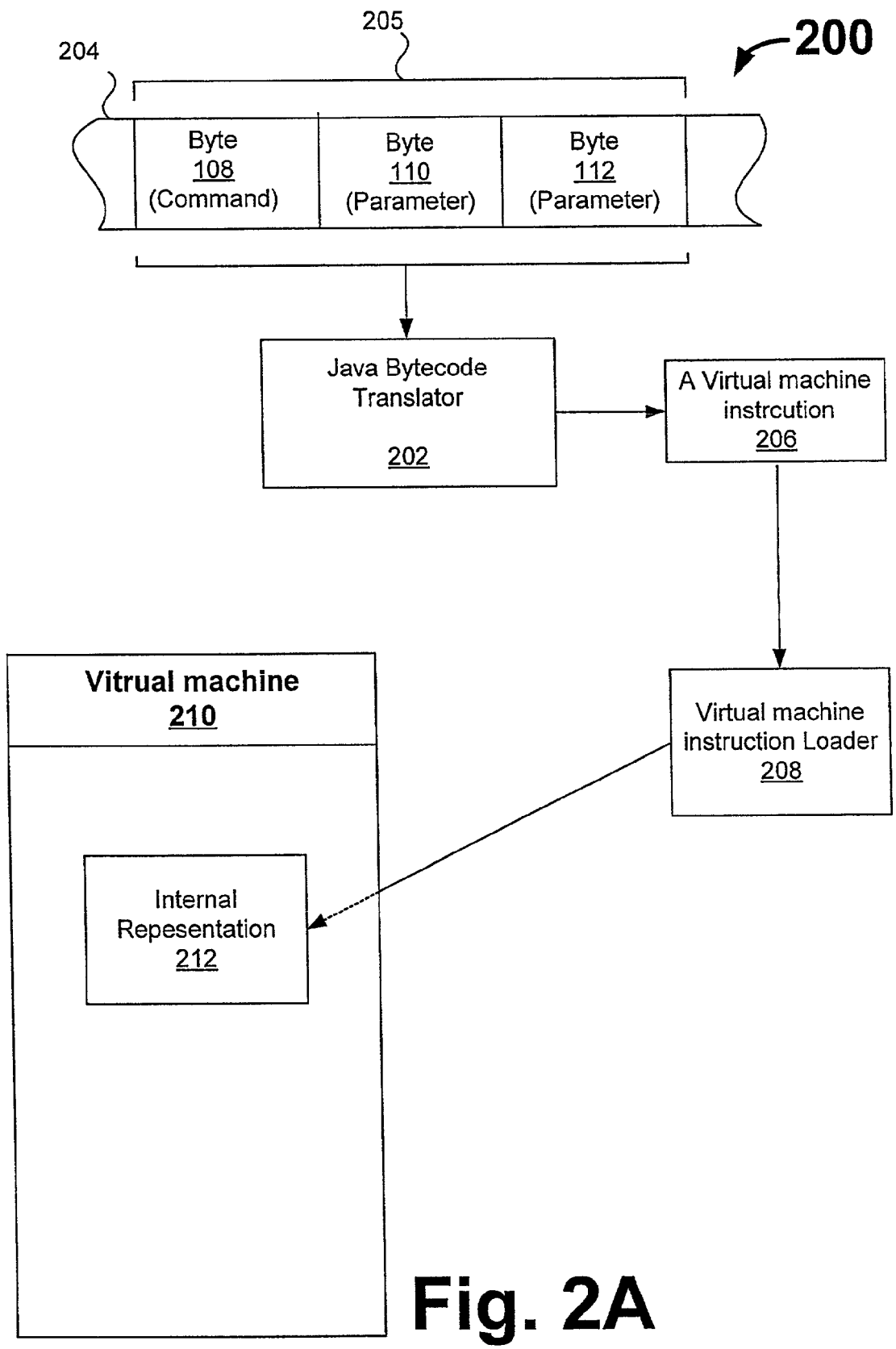
FIG. 2A is a block diagram representation of a computing environment including a Java Bytecode instruction translator in accordance with one embodiment of the invention.

FIG. 2A is a block diagram representation of a computing environment 200 including a Java Bytecode instruction translator 202 in accordance with one embodiment of the invention. The Java Bytecode instruction translator 202 operates to convert one or more bytes of a Java Bytecode stream 204, representing a Java Bytecode instruction 205 into a virtual machine instruction 206 containing one or more bytes. The Java Bytecode instruction 205 in the Java Bytecode stream 204 can be, for example, a "Lcd" command 108 with its associated parameters 110 and 112, as described in FIG. 1.

Typically, one byte of the virtual machine instruction 206 is designated to represent a virtual machine command (or opcode). In addition, one or more additional bytes may be associated with the virtual machine command (or opcode) to represent its parameters. As a result, one or more bytes of the virtual machine instruction 206 can represent a Java Bytecode instruction having one or more bytes that collectively represent a Java Bytecode instruction, namely a command and possibly the parameters associated with the command (e.g., a one byte Java iconst_1 Bytecode instruction, three bytes representing Java Bytecode Lcd instruction, etc).

As will be appreciated, the virtual machine instruction 206 can represent similar virtual machine operations that the Java Bytecode instruction 205 represents. In addition, the virtual machine instruction 206 can be loaded by a virtual machine instruction loader 208 into a virtual machine 210 as an internal representation 212. As will become apparent, the internal representation 212 can be used to significantly improve the performance of the virtual machine.

Furthermore, the Java Bytecode instruction translator 202 is capable of converting a set of Java Bytecode executable instructions into a more elegant set of instructions that is especially suitable for systems with limited resources. The operations performed by a conventional Bytecode instruction set can effectively be represented by fewer inventive virtual machine instructions. Accordingly, the number of the executable virtual machine instructions can be significantly less than the number of conventional Java Bytecode executable instructions needed to perform the same set of operations. In other words, two or more distinct conventional Java Bytecode executable instructions can effectively be mapped into an inventive virtual machine instruction.

Figure 2B:
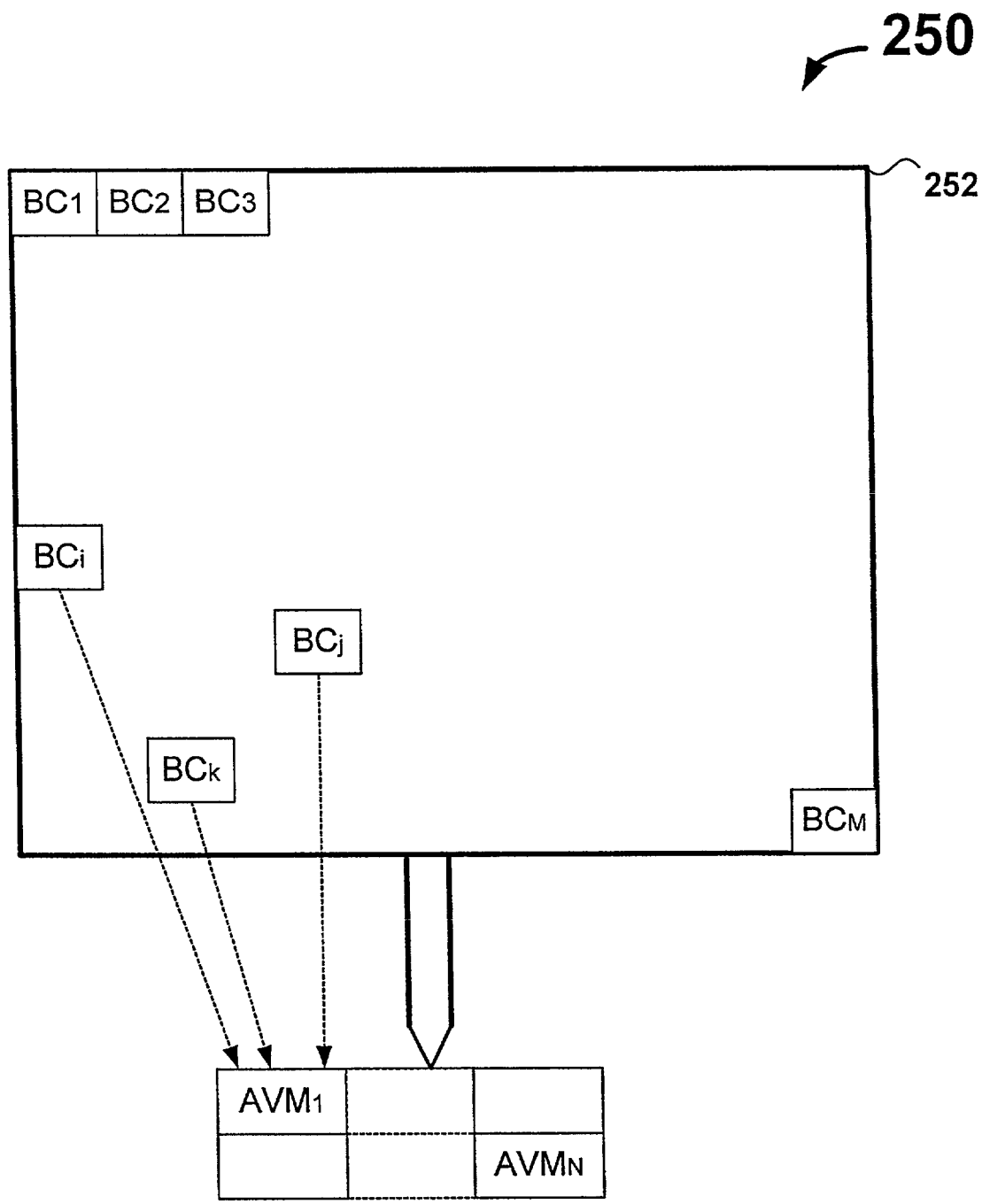
FIG. 2B illustrates a mapping that can be performed by the Java Bytecode instruction translator of FIG. 2A in accordance with one embodiment of the invention.

To elaborate, FIG. 2B illustrates a mapping 250 that can be performed, for example, by the Java Bytecode instruction translator 202 in accordance with one embodiment of the invention. As illustrated in FIG. 2B, a set of conventional Java Bytecode executable instructions 252 can be mapped into a corresponding set of inventive virtual machine instructions 254. It should be noted that the set of Java Bytecode executable instructions 252 consists of M instructions, Bytecode Instructions ($BC_1$–$BC_M$). It should also be noted that each of the Byte code Instructions $BC_1$–$BC_M$ represent a unique instruction in the set of Java Bytecode executable instructions 252. As will be appreciated, the corresponding set of executable virtual machine instructions 254 consists of N instructions ($AVM_1$–$AVM_N$), a number that can be significantly less than M (the number of Java Bytecode executable instructions 252). Accordingly, two or more Byte code Instructions of the Java Bytecode executable instructions 252 can be mapped into the same executable virtual machine instruction. For example, Bytecode Instructions $BC_i$, $BC_j$ and $BC_k$ can all be mapped into the same virtual machine executable instruction, namely, the instruction $AVM_1$. In addition, as will be described below, two or more inventive virtual machine instructions from the set 254 can be combined to effectively represent a Java Bytecode instruction in the set 252.

Figure 3:
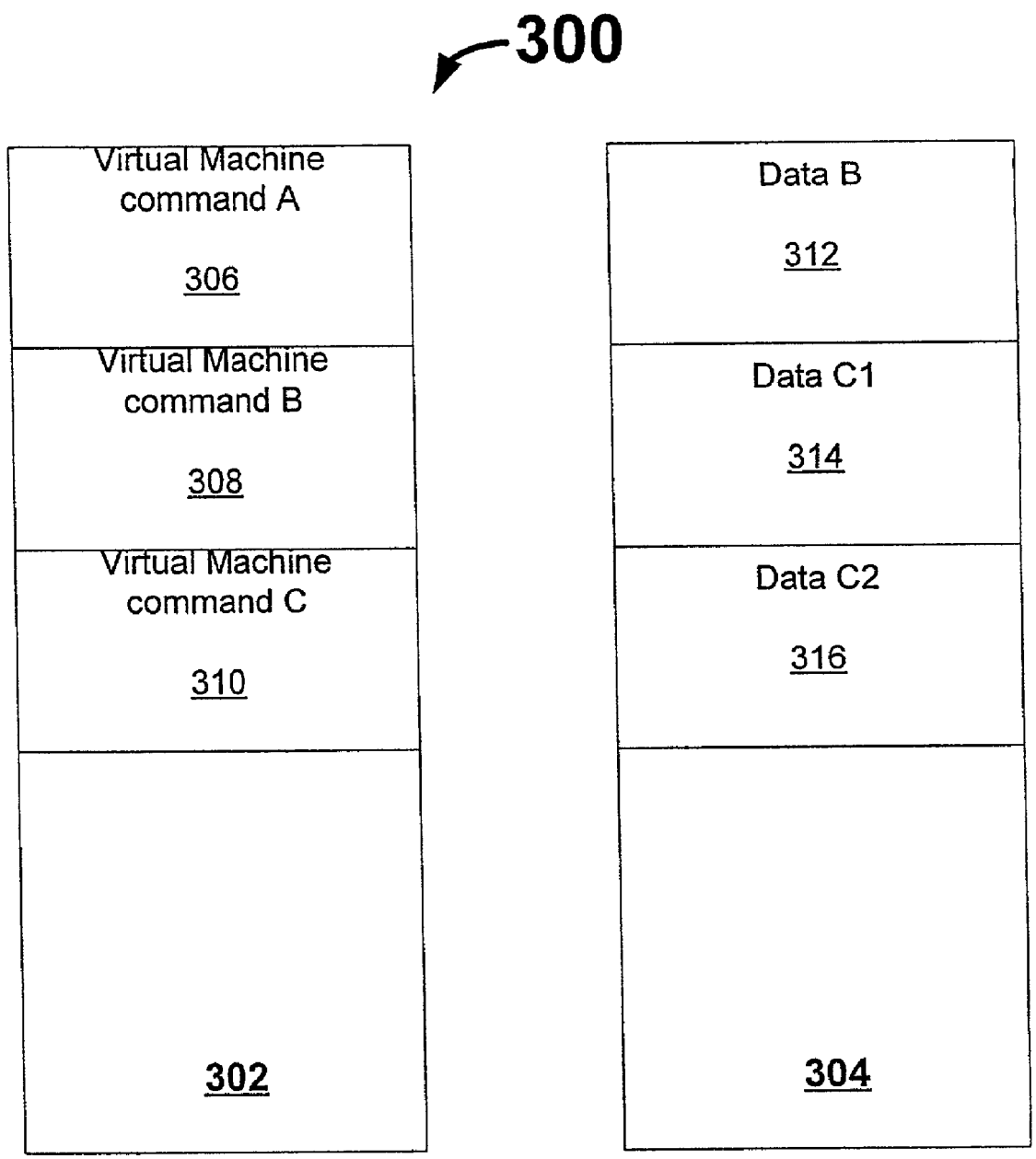
FIG. 3 illustrates an internal representation of Java instructions in accordance with one embodiment of the invention.

As noted above, a virtual machine instruction, for example, the instruction $AVM_1$, can be loaded by a virtual machine instruction loader into a virtual machine as an internal representation that can be used to significantly improve the performance of the virtual machine. FIG. 3 illustrates an internal representation 300 in accordance with one embodiment of the invention. The internal representation 300 can, for example, be implemented as a data structure embodied in a computer readable medium that is suitable for use by a virtual machine.

As shown in FIG. 3, the internal representation 300 includes a pair of streams, namely, a code stream 302 and a data stream 304.

It should be noted that conventionally Java Bytecode instructions are internally represented as a single stream in the virtual machine. However, as shown in FIG. 3, the internal representation 300 includes a pair of streams, namely, a code stream 302 and a data stream 304. More details about representing instructions as a pair of streams can be found in the U.S. patent application Ser. No. 09/703,449, entitled "IMPROVED FRAMEWORKS FOR LOADING AND EXECUTION OF OBJECT-BASED PROGRAMS".

Each one of the entries in the code stream 302 and/or data stream 304 represent one or more bytes. The code stream 302 includes various virtual machine commands (or instructions) 306, 308 and 310. The virtual machine commands (or instruction) 306 represents a virtual machine instruction that does not have any parameters associated with it. On the other hand, each of the virtual machine commands B and C have associated data parameters that are represented in the data stream 304. More particularly, data B is the corresponding data parameter of the virtual machine command B, and data C1 and C2 are the data parameters associated with the command C.

It should be noted that the inventive virtual machine command B and data B represents one or more conventional Java Bytecodes which have been converted, for example, by the Java Bytecode instruction translator 202 of FIG. 2A. Similarly, the virtual machine command C, data C1 and C2 collectively represent the one or more Java Bytecodes that have been converted into an inventive virtual machine instruction with its appropriate data parameters.

Figures 4A, 4B:
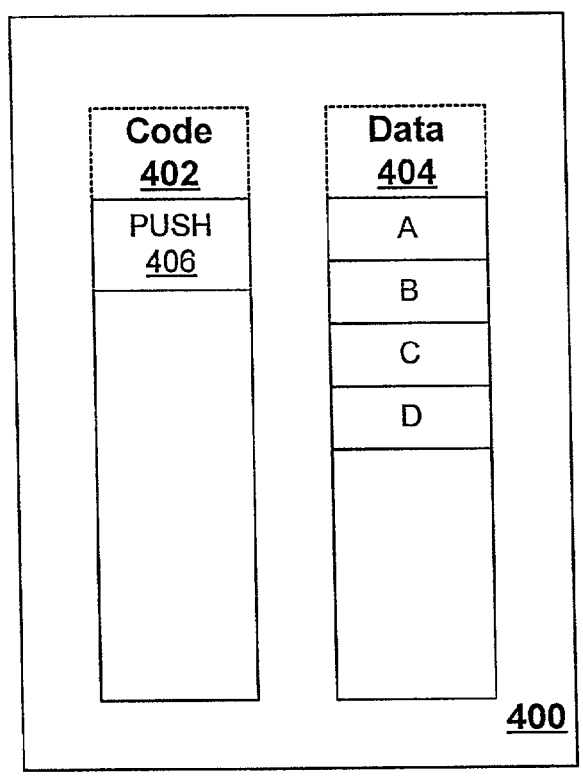
FIG. 4A illustrates an internal representation of a set of Java Load Constant Bytecode instructions in accordance with one embodiment of the invention.
FIG. 4B illustrates a set of conventional Java Bytecode instructions that can be represented by an inventive Push command.

FIG. 4A illustrates an internal representation 400 of a set of Java Load Constant Bytecode instructions in accordance with one embodiment of the invention. The internal representation 400 can, for example, be implemented as a data structure embodied in a computer readable medium that is suitable for use by a virtual machine.

In the described embodiment, each entry in the code stream 402 and data stream 404 represents one byte. As such, the code stream 402 includes a one byte Push command 406, representing an inventive virtual machine command suitable for representation of one or more conventional Java Load Constant Bytecode instructions. The data stream 404 includes the data parameters associated with the Push command 406, namely, bytes A, B, C and D. As will be appreciated, at execution time, the virtual machine can execute the Push command 406. Accordingly, the value represented by the bytes A, B, C and D in the data stream 404 can be pushed on the execution stack. In this way, the Push command 406 can effectively represent various Java Bytecode instructions that push values represented by 4 bytes (one word) on the execution stack at run time. FIG. 4B illustrates a set of conventional Java Bytecode instructions that can be represented by an inventive Push command (e.g., Push command 406).

Figures 4C, 4D:
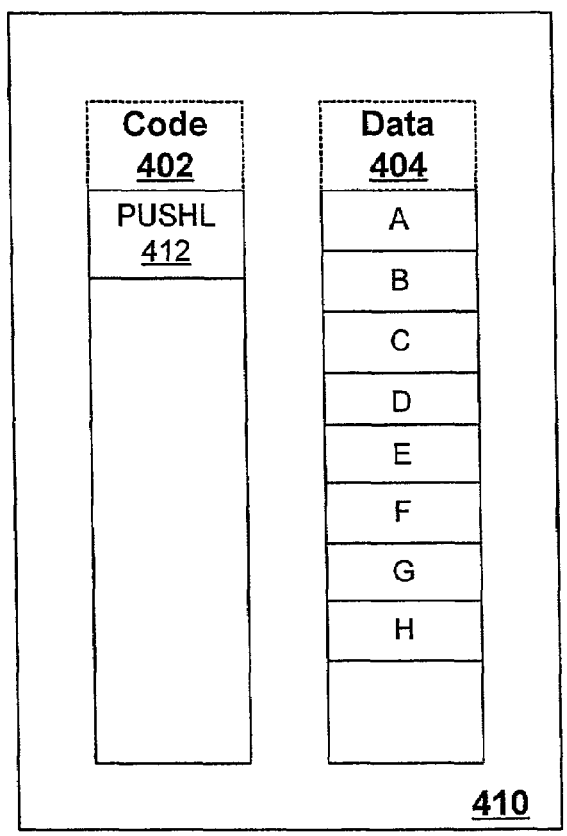
FIG. 4C illustrates an internal representation of a set of conventional Java Load Constant Bytecode instructions in accordance with another embodiment of the invention.
FIG. 4D illustrates a set of conventional Java Bytecode instructions that can be represented by a single PushL command in accordance with one embodiment of the invention.

FIG. 4C illustrates an internal representation 410 of a set of conventional Java Load Constant Bytecode instructions in accordance with another embodiment of the invention. Similar to the internal representation 400 of FIG. 4A, the internal representation 410 includes a pair of streams, namely, the code stream 402 and data stream 404, wherein each entry in the streams represents one byte. However, in FIG. 4B, the code stream 402 includes a one byte PushL command 412, representing another inventive virtual machine instruction suitable for representation of one or more Java Load Constant Bytecode instructions. It should be noted that the PushL command 412 has 8 bytes of data associated with it, namely, the bytes represented by A, B, C, D, E, F, G and H in the data stream 404. At execution time, the virtual machine can execute the PushL command 412 to push the value represented by the bytes A, B, C, D, E, F, G and H in the data stream 404, on the top of the execution stack. Accordingly, the PushL command 412 can effectively represent various Java Bytecode instructions that push 8 byte (two word) values on the execution stack at run time. FIG. 4D illustrates a set of conventional Java Bytecode instructions that can be represented by a single PushL command (e.g., PushL command 412) in accordance with one embodiment of the invention.

Figures 4E, 4F:
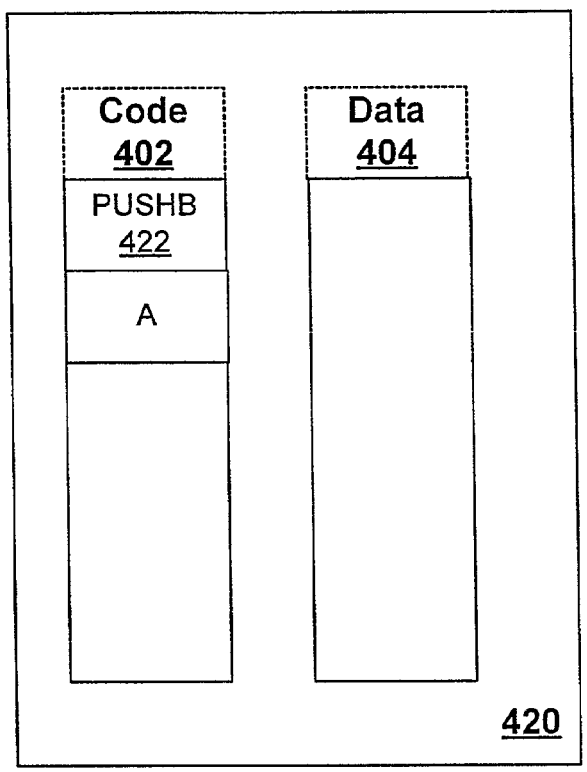
FIG. 4E illustrates an internal representation of a set of Java Load Constant Bytecode instructions in accordance with yet another embodiment of the invention.
FIG. 4F illustrates a set of Java Bytecode instructions that can be represented by a single PushB command in accordance with one embodiment of the invention.

FIG. 4E illustrates an internal representation 420 of a set of Java Load Constant Bytecode instructions in accordance with yet another embodiment of the invention. Again, the internal representation 420 includes the code stream 402 and data stream 404, wherein each entry in the streams represents one byte. However, in FIG. 4E, the code stream 402 includes a one byte PushB command 422, representing yet another inventive virtual machine instruction suitable for representation of one or more Java Load Constant Bytecode instructions. It should be noted that the PushB command 422 has a one byte data parameter A associated with it. As shown in FIG. 4E, the data parameter can be stored in the code stream 402. However, it should be noted that in accordance with other embodiment of the invention, the data parameter A can be stored in the data stream 404. In any case, the PushB command 422 can effectively represent various Java Bytecode instructions that push one byte values on the execution stack at run time. FIG. 4F illustrates a set of Java Bytecode instructions that can be represented by a single PushB command (e.g., PushB command 422) in accordance with one embodiment of the invention.

Figure 5A:
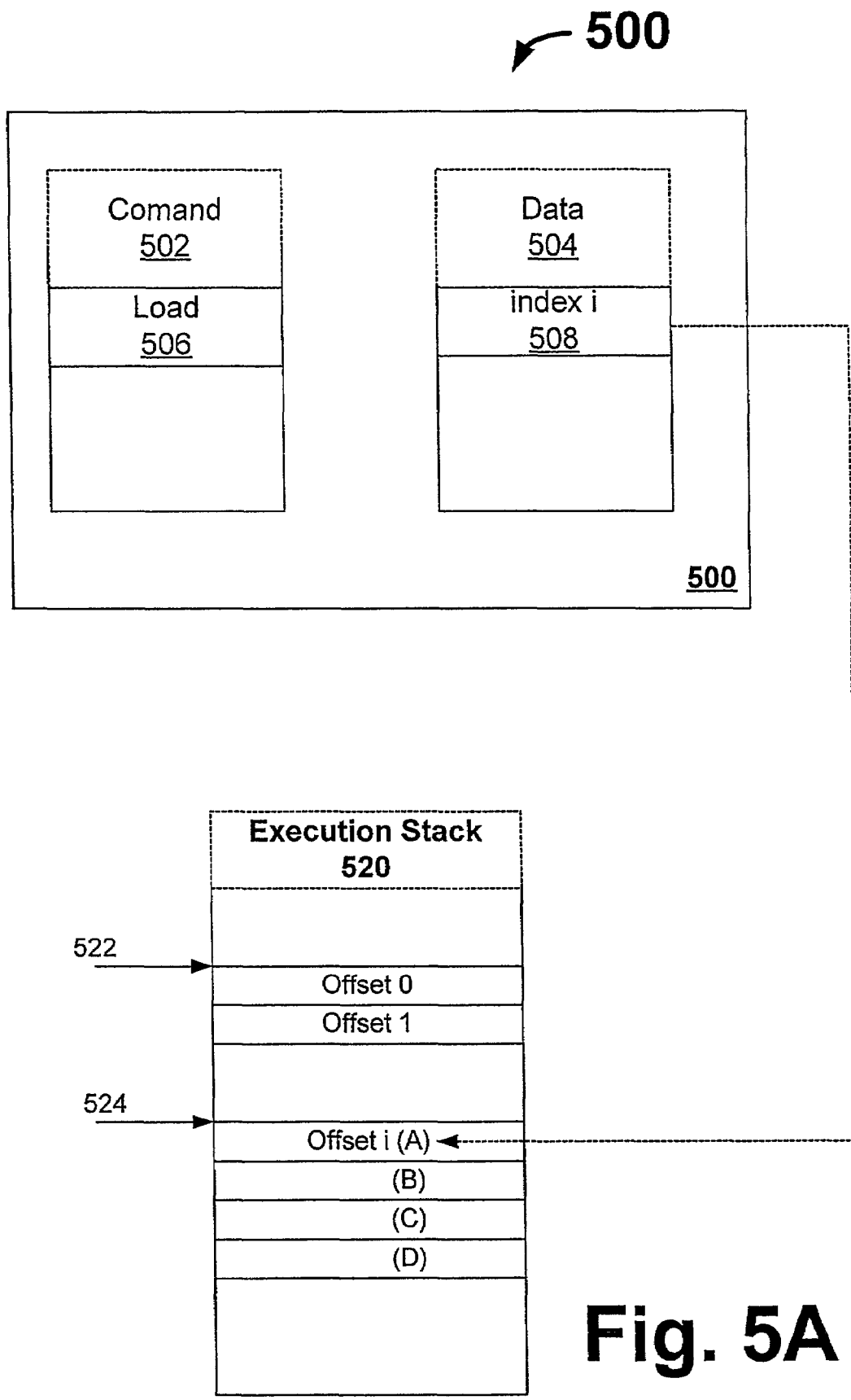
FIG. 5A illustrates an internal representation of a set of Java Load from a local variable instructions in accordance with another embodiment of the invention.

FIG. 5A illustrates an internal representation 500 of a set of Java "Load from a local variable" instructions in accordance with another embodiment of the invention. In the described embodiment, a code stream 502 of the internal representation 500 includes a Load command 506, representing an inventive virtual machine instruction suitable for representation of one or more Java "Load from a local variable" Bytecode instructions. It should be noted that the Load command 506 has a one byte parameter associated with it, namely, an index, 508 in the data stream 504. As will be appreciated, at run time, the Load command 506 can be executed by a virtual machine to load (or push) a local variable on top of the execution stack 520. By way of example, an $offset_0$ 522 can indicate the starting offset for the local variables stored on the execution stack 520. Accordingly, an $offset_i$ 524 identifies the position in the execution stack 520 which corresponds to the $index_i$ 508 shown in FIG. 5A.

It should be noted that in the described embodiment, the Load command 506 is used to load local variables as 4 bytes (one word). As a result, the value indicated by the 4 bytes A, B, C and D (starting at $offset_i$ 524) is loaded on the top of the execution stack 520 when the Load command 506 is executed. In this manner, the Load command 506 and index, 508 can be used to load (or Push) 4 byte local variables on top of the execution stack at run time. As will be appreciated, the Load command 506 can effectively represent various conventional Java Bytecode instructions. FIG. 5B illustrates a set of Java Bytecode instructions for loading 4 byte local variables that can be represented by an inventive Load command (e.g., Load command 412) in accordance with one embodiment of the invention.

It should be noted that the invention also provides for loading local variables that do not have values represented by 4 bytes. For example, FIG. 5C illustrates a set of Java Bytecode instructions for loading 8 byte local variables in accordance with one embodiment of the invention. As will be appreciated, all of the Java Bytecode instructions listed in FIG. 5C can be represented by a single inventive virtual machine instruction (e.g., a LoadL command). The LoadL command can operate, for example, in a similar manner as discussed above.

Figure 6A:
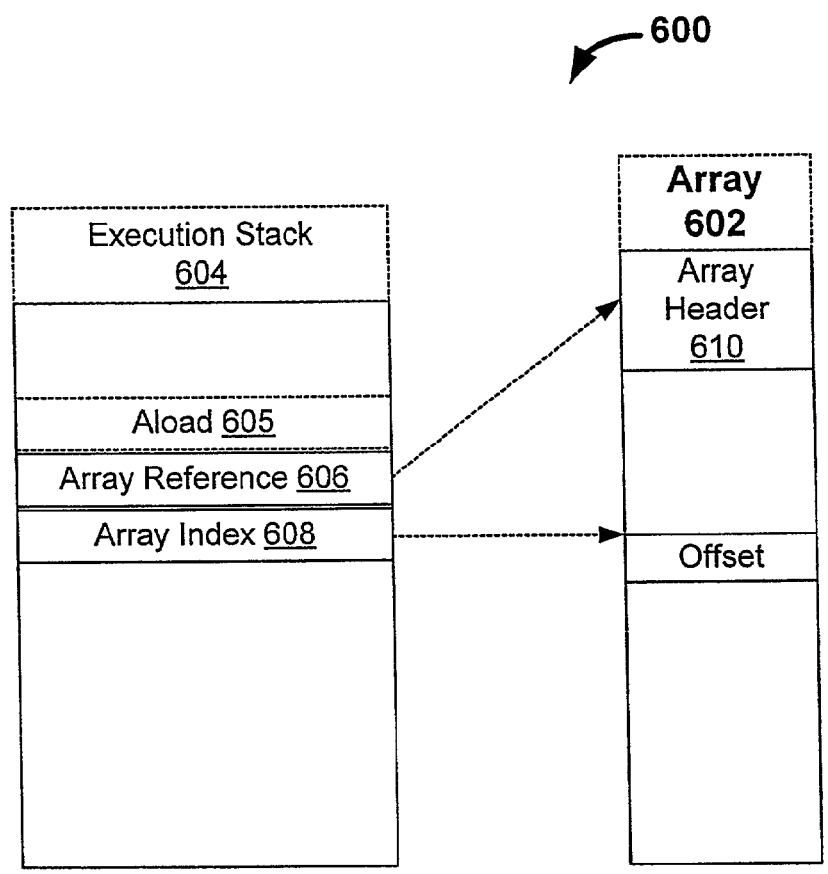
FIG. 6A illustrates a computing environment including an Aload (load from array) virtual machine instruction in accordance with one embodiment of the invention.
Figure 6B:
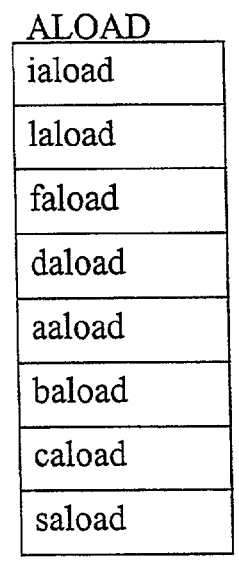
FIG. 6B illustrates a set of conventional Java Bytecode instructions for loading arrays that can be represented by a single inventive virtual machine instruction in accordance with one embodiment of the invention.
Figure 6C:
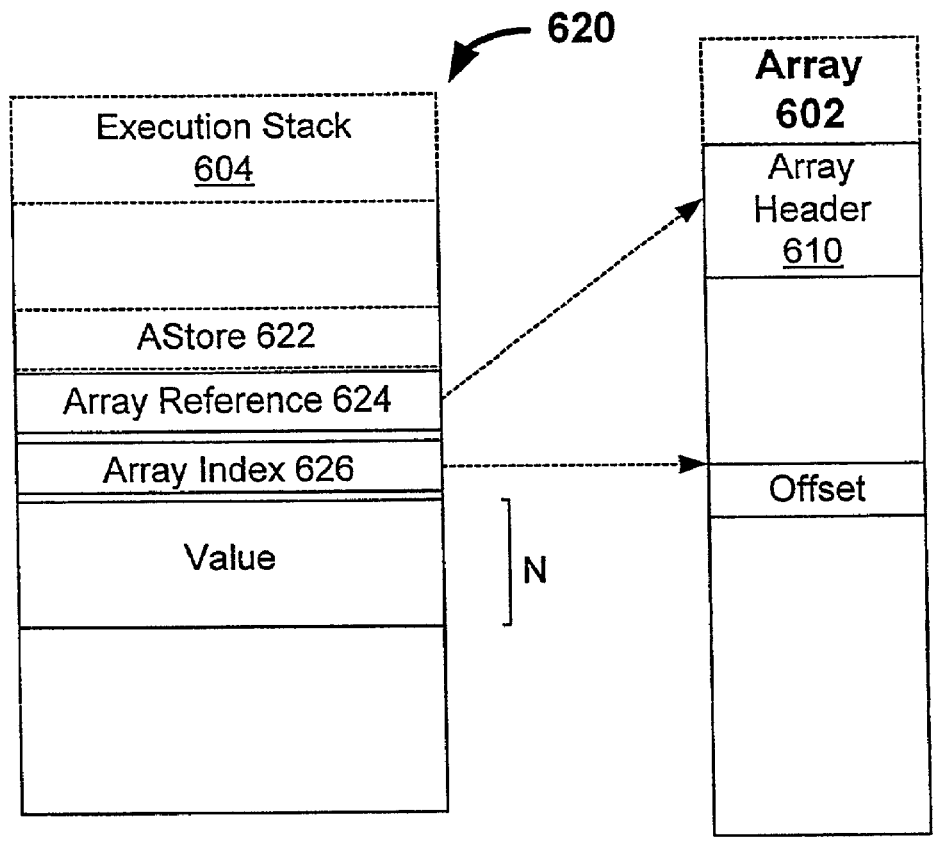
FIG. 6C illustrates a computing environment including an AStore (store into array) virtual machine instruction in accordance with one embodiment of the invention.
Figure 6:
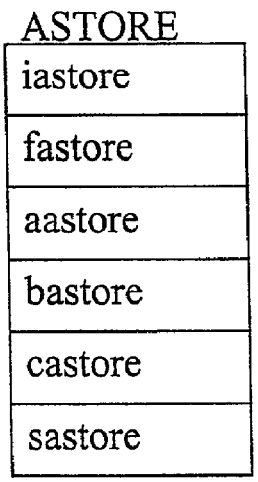
FIGS. 6D and 6E illustrate a set of conventional Java Bytecode instructions for storing arrays that can be represented by a single inventive virtual machine instruction.
FIGS. 6F and 6G illustrate some Java conventional Bytecode instructions for performing conditional flow operations which can be represented by two inventive virtual machine instructions in accordance with one embodiment of the invention.
Figure 6:
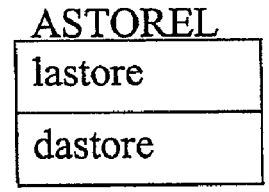

In addition, the invention provides for loading values from arrays into an execution stack. By way of example, FIG. 6A illustrates a computing environment 600 in accordance with one embodiment of the invention. The computing environment 600 includes an array 602 representative of a Java array stored in a portion of a memory of the computing environment 600. An execution stack 604 is also depicted in FIG. 6. As will be appreciated, an inventive virtual machine instruction ALoad (array load) 605 can be utilized to facilitate loading of various values from the array 602 to the top of the execution stack 604.

During the execution of the virtual machine instruction ALoad 605, an array-reference 606 can be utilized (e.g., resolved) to determine the location of the array 602. In addition, an array-index 608 can be used to identify the appropriate offset of the array 602 and thereby indicate the appropriate value that is to loaded from the array 602 on the execution stack 604. As will be appreciated, the inventive virtual machine instruction ALoad can be used to load the appropriate values from various types of arrays (e.g., 1 byte, 2 bytes, 4 bytes, 8 bytes arrays). To achieve this, a header 610 of the array 602 can be read to determine the arrays' type. Accordingly, based on the type of the array 602 as indicated by the header 610, the appropriate value that is to be loaded from the array can be determined by using the array-index 608. This value can then be loaded onto the top of the execution stack 604.

Thus, the inventive virtual machine instruction ALoad can effectively represent various Java Bytecode instructions that are used to load values from an array. FIG. 6B illustrates a set of conventional Java Bytecode instructions for loading arrays that can be represented by a single inventive virtual machine instruction (e.g., ALoad) in accordance with one embodiment of the invention.

As will be appreciated, the invention also provides for virtual machine instructions used to store values into arrays. By way of example, FIG. 6C illustrates a computing environment 620 in accordance with one embodiment of the invention. An inventive AStore 622 (store into array) virtual machine instruction can be used to store various values from the execution stack 604 into different types of arrays in accordance with on embodiment of the invention. Again, the header 610 of the array 602 can be read to determine the array's type. Based on the array's type, the appropriate value (i.e., the appropriate number of bytes N on the execution stack 604 of FIG. 6B) can be determined. This value can then be stored in the array 602 by using the array-index 626. Thus, the inventive virtual machine instruction ALoad can effectively represent various Java Bytecode instructions that are used to store values into an array. FIGS. 6D and 6E illustrate a set of conventional Java Bytecode instructions for storing arrays that can be represented by an inventive virtual machine instruction (e.g., Astore) in accordance with one embodiment of the invention.

Still further, two or more of the inventive virtual machine instructions can be combined to perform relatively more complicated operations in accordance with one embodiment of the invention. By way of example, the conditional flow control operation performed by the Java Bytecode instruction "lcmp" (compare two long values on the stack and based on the comparison push 0 or 1 on the stack) can effectively be performed by performing an inventive virtual machine instruction LSUB (Long subdivision) followed by another inventive virtual machine instruction JMPEQ (Jump if equal). FIG. 6F and 6G illustrate some Java conventional Bytecode instructions for performing conditional flow operations which can be represented by two inventive virtual machine instructions in accordance with one embodiment of the invention.

Figure 7A:
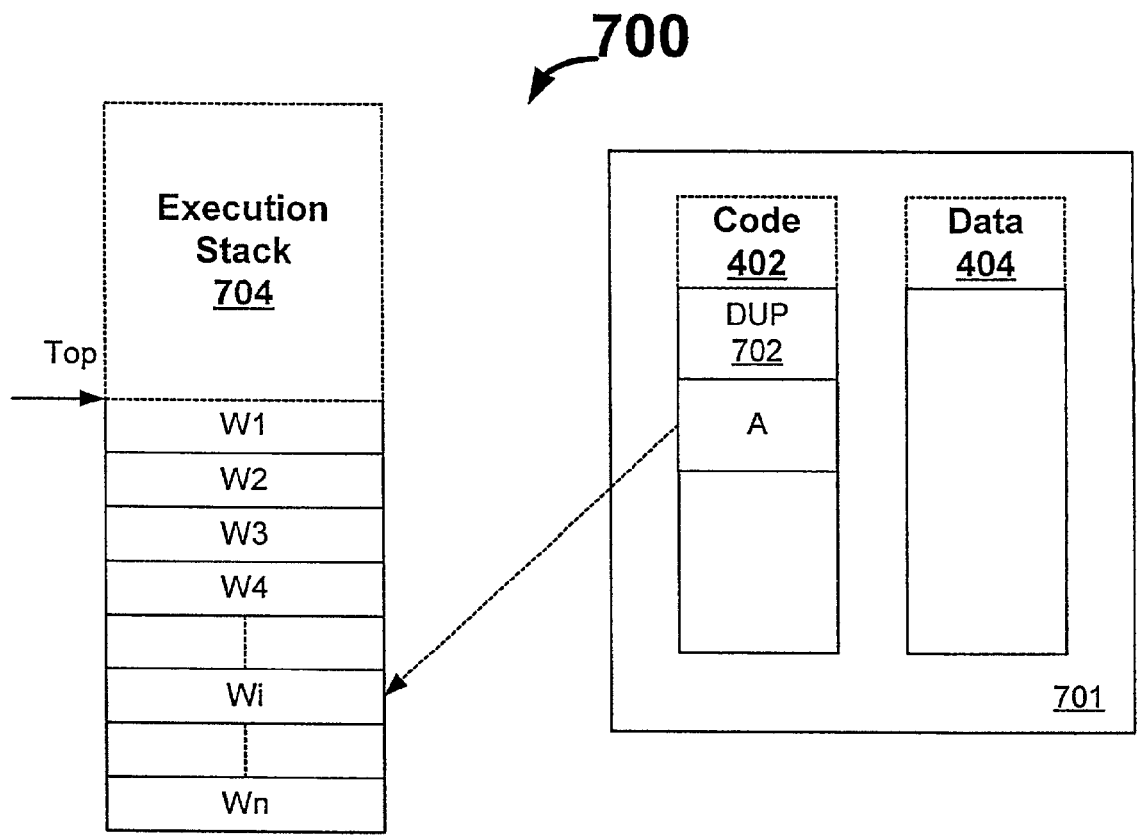
FIG. 7A illustrates a computing environment including an internal representation of a DUP instruction suitable for duplicating values on the stack in accordance with one embodiment of the invention.
Figure 7B:
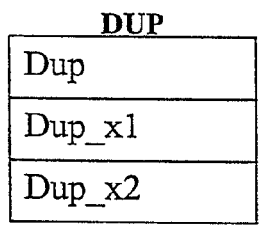
FIGS. 7B and 7C illustrate various Java Bytecode instructions that can be represented by an inventive virtual machine instruction in accordance with one embodiment of the invention.
Figure 7C:
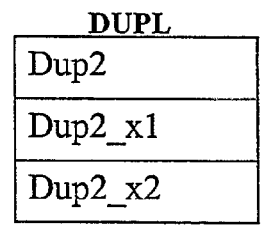

The invention also provides for inventive operations that cannot be performed by Java Bytecode instructions. By way of example, an inventive virtual machine operation "DUP" is provided in accordance with one embodiment of the invention. The inventive virtual machine instruction DUP allows values in various positions on the execution stack to be duplicated on the top of the execution stack. FIG. 7A illustrates a computing environment 700 including an internal representation 701 of a DUP instruction 702 suitable for duplicating values on the stack in accordance with one embodiment of the invention. The internal representation 701 includes a pair of streams, namely, a code stream 402 and a data stream 404. In the described embodiment, each entry in the code stream 402 and data stream 404 represents one byte. The inventive virtual machine instruction DUP 702 is associated with a data parameter A in the code stream 402. Again, it should be noted that Data parameter A can be implemented in the data stream 404. In any case, the data parameter A indicates which 4 byte value (word value) on an execution stack 704 should be duplicated on the top of the execution stack 704. The data parameter A can indicate, for example, an offset from the top of the execution stack 704. As shown in FIG. 7A, the data parameter A can be a reference to $W_i$, a word (4 byte) value on the execution stack. Accordingly, at execution time, the virtual machine can execute the DUP command 702. As a result, the $W_i$ word will be duplicated on the top of the stack. Thus, as will be appreciated, the inventive DUP virtual machine instructions can effectively replace various Java Byte instructions that operate to duplicate 4 byte values on top of the execution. FIG. 7B illustrates some of these Java Bytecode instructions. Similarly, as illustrated in FIG. 7C, an inventive DUPL virtual machine can be provided to effectively replace various Java Bytecode instructions that operate to duplicate 8 byte values (2 words) on top of the execution stack.

It should be noted that conventional Java Bytecode instructions only allow for duplication of values in certain positions on the execution stack (i.e, dup, dup_x1 and dupx2 respectively allow duplication of W1, W2 and W3 on the stack). However, the inventive virtual machine instructions DUP and DUPL can be used to duplicate a much wider range of values on the execution stack (e.g., W4, Wi, WN, etc.)

FIGS. 8A and 8B illustrate mapping of Java Bytecode "Return" instructions to virtual machine instructions provided in accordance with one embodiment of the invention. As shown in FIG. 8A, various Java Bytecode instructions can be effectively mapped into a Return virtual machine instruction. As will be appreciated, the Return virtual machine instruction operates to put 4 byte values (one word) on the execution stack in a similar manner as the virtual machine instructions for loading constants on the stack described above (e.g., iload). FIG. 8B illustrates a mapping of Java Bytecode return instructions to a "Lreturn" virtual machine instruction that can operate to put 8 byte values (two words) on the execution stack.

In a similar manner, FIG. 9 illustrates a mapping of Java Bytecode instantiation instructions to the virtual machine instructions provided in accordance with one embodiment of the invention. Again, the four various Java Bytecode instructions can be effectively mapped into a virtual machine instruction (e.g., NEW). The virtual machine instruction NEW operates to instantiate objects and arrays of various types. In one embodiment, the inventive virtual machine instruction NEW operates to determine the types of the objects or arrays based on the parameter value of the Bytecode instantiation instructions. As will be appreciated, the Bytecode instructions for instantiation are typically followed by a parameter value that indicates the type. Thus, the parameter value is readily available and can be used to allow the NEW virtual machine instruction to instantiate the appropriate type at execution time.

Appendix A illustrates mapping of a set of conventional Java Bytecode instructions to one or more of the inventive virtual machine instructions listed the in right column.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

APPENDIX A

| | |
|---|---|
| nop | IGNORE_OPCODE |
| aconst_null | OP_PUSHB |
| iconst_m1 | OP_PUSHB |
| iconst_0 | OP_PUSHB |
| iconst_1 | OP_PUSHB |
| iconst_2 | OP_PUSHB |
| iconst_3 | OP_PUSHB |
| iconst_4 | OP_PUSHB |
| iconst_5 | OP_PUSHB |
| lconst_0 | OP_PUSHL |
| lconst_1 | OP_PUSHL |
| fconst_0 | OP_PUSH |
| fconst_1 | OP_PUSH |
| fconst_2 | OP_PUSH |
| dconst_0 | OP_PUSHL |
| dconst_1 | OP_PUSHL |
| bipush | OP_PUSHB |
| sipush | OP_PUSH |
| ldc | OP_PUSH |
| ldc_w | OP_PUSH |
| ldc2_w | OP_PUSHL |
| iload | OP_LOAD |
| lload | OP_LOADL |
| fload | OP_LOAD |
| dload | OP_LOADL |
| aload | OP_LOAD |
| iload_0 | OP_LOAD |
| iload_1 | OP_LOAD |
| iload_2 | OP_LOAD |
| iload_3 | OP_LOAD |
| lload_0 | OP_LOADL |
| lload_1 | OP_LOADL |
| lload_2 | OP_LOADL |
| lload_3 | OP_LOADL |
| fload_0 | OP_LOADL |
| fload_1 | OP_LOAD |
| fload_2 | OP_LOAD |
| fload_3 | OP_LOAD |
| dload_0 | OP_LOADL |
| dload_1 | OP_LOADL |
| dload_2 | OP_LOADL |
| dload_3 | OP_LOADL |
| aload_0 | OP_LOAD |
| aload_1 | OP_LOAD |
| aload_2 | OP_LOAD |
| aload_3 | OP_LOAD |
| iaload | OP_ALOAD |
| laload | OP_ALOAD |
| faload | OP_ALOAD |
| daload | OP_ALOAD |

APPENDIX A-continued

| | |
|---|---|
| aaload | OP_ALOAD |
| baload | OP_ALOAD |
| caload | OP_ALOAD |
| saload | OP_ALOAD |
| istore | OP_STOR |
| lstore | OP_STORL |
| fstore | OP_STOR |
| dstore | OP_STORL |
| astore | OP_STOR |
| istore_0 | OP_STOR |
| istore_1 | OP_STOR |
| istore_2 | OP_STOR |
| istore_3 | OP_STOR |
| lstore_0 | OP_STORL |
| lstore_1 | OP_STORL |
| lstore_2 | OP_STORL |
| lstore_3 | OP_STORL |
| fstore_0 | OP_STOR |
| fstore_1 | OP_STOR |
| fstore_2 | OP_STOR |
| fstore_3 | OP_STOR |
| dstore_0 | OP_STORL |
| dstore_1 | OP_STORL |
| dstore_2 | OP_STORL |
| dstore_3 | OP_STORL |
| astore_0 | OP_STOR |
| astore_1 | OP_STOR |
| astore_2 | OP_STOR |
| astore_3 | OP_STOR |
| iastore | OP_ASTORE |
| lastore | OP_ASTOREL |
| fastore | OP_ASTORE |
| dastore | OP_ASTOREL |
| aastore | OP_ASTORE |
| bastore | OP_ASTORE |
| castore | OP_ASTORE |
| sastore | OP_ASTORE |
| pop | OP_POP |
| pop2 | OP_POP |
| dup | OP_DUP |
| dup_x1 | OP_DUP |
| dup_x2 | OP_DUP |
| dup2 | OP_DUPL |
| dup2_x1 | OP_DUPL |
| dup2_x2 | OP_DUPL |
| swap | OP_SWAP |
| iadd | OP_IADD |
| ladd | OP_LADD |
| fadd | OP_FADD |
| dadd | OP_DADD |
| isub | OP_ISUB |
| lsub | OP_LSUB |
| fsub | OP_FSUB |
| dsub | OP_DSUB |
| imul | OP_IMUL |
| lmul | OP_LMUL |
| fmul | OP_FMUL |
| dmul | OP_DMUL |
| idiv | OP_IDIV |
| ldiv | OP_LDIV |
| fdiv | OP_FDIV |
| ddiv | OP_DDIV |
| irem | OP_IREM |
| lrem | OP_LREM |
| frem | OP_FREM |
| drem | OP_DREM |
| ineg | OP_INEG |
| lneg | OP_LNEG |
| fneg | OP_FNEG |
| dneg | OP_DNEG |
| ishl | OP_ISHL |
| lshl | OP_LSHL |
| ishr | OP_ISHR |
| lshr | OP_LSHR |
| iushr | OP_IUSHR |
| lushr | OP_LUSHR |
| iand | OP_IAND |
| land | OP_LAND |
| ior | OP_IOR |

APPENDIX A-continued

| | |
|---|---|
| lor | OP_LOR |
| ixor | OP_IXOR |
| lxor | OP_LXOR |
| iinc | OP_IINC |
| i2l | OP_I2L |
| i2f | IGNORE_OPCODE |
| i2d | OP_I2D |
| l2i | OP_L2I |
| l2f | OP_L2F |
| l2d | OP_L2D |
| f2i | IGNORE_OPCODE |
| f2l | OP_F2L |
| f2d | OP_F2D |
| d2i | OP_D2I |
| d2l | OP_D2L |
| d2f | OP_D2F |
| i2b | IGNORE_OPCODE |
| i2c | IGNORE_OPCODE |
| i2s | IGNORE_OPCODE |
| lcmp | OP_LSUB, OP_JMPEQ |
| fcmpl | OP_FSUB, OP_JMPLE |
| fcmpg | OP_FSUB, OP_JMPGE |
| dcmpl | OP_DCMP, OP_JMPLE |
| dcmpg | OP_DCMP, OP_JMPGE |
| ifeq | OP_JMPEQ |
| ifne | OP_JMPNE |
| iflt | OP_JMPLT |
| ifge | OP_JMPGE |
| ifgt | OP_JMPGT |
| ifle | OP_JMPLE |
| if_icmpeq | OP_ISUB, OP_JMPEQ |
| if_icmpne | OP_ISUB, OP_JMPNE |
| if_icmplt | OP_ISUB, OP_JMPLT |
| if_icmpge | OP_ISUB, OP_JMPGE |
| if_icmpgt | OP_ISUB, OP_JMPGT |
| if_icmple | OP_ISUB, OP_JMPLE |
| if_acmpeq | OP_ISUB, OP_JMPEQ |
| if_acmpne | OP_ISUB, OP_JMPNE |
| goto | OP_JMP |
| jsr | OP_JSR |
| ret | OP_RET |
| tableswitch | OP_SWITCH |
| lookupswitch | OP_SWITCH |
| ireturn | OP_RETURN |
| lreturn | OP_LRETURN |
| freturn | OP_RETURN |
| dreturn | OP_LRETURN |
| areturn | OP_RETURN |
| return | OP_RETURNV |
| getstatic | OP_RESOLVE |
| putstatic | OP_RESOLVEP |
| getfield | OP_RESOLVE |
| putfield | OP_RESOLVEP |
| invokevirtual | OP_RESOLVE |
| invokespecial | OP_RESOLVE |
| invokestatic | OP_RESOLVE |
| invokeinterface | OP_RESOLVE |
| xxxunusedxxx | IGNORE_OPCODE |
| new | OP_NEW |
| newarray | OP_NEW |
| anewarray | OP_NEW |
| arraylength | OP_ARRAYLENGTH |
| athrow | OP_THROW |
| checkcast | IGNORE_OPCODE |
| instanceof | OP_INSTANCEOF |
| monitorenter | OP_MUTEXINC |
| monitorexit | OP_MUTEXDEC |
| wide | OP_WIDE |
| multianewarray | OP_NEW |
| ifnull | OP_JMPEQ |
| ifnonnull | OP_JMPNE |
| goto_w | OP_JMP |
| jsr_w | OP_JSR |

What is claimed is:

1. A computer readable medium including computer program code for executing a reduced set of virtual machine instructions suitable for execution in a virtual machine, said computer readable medium comprising:

computer program code for storing the reduced set of virtual machine instructions representing a number of corresponding Java Bytecade executable instructions that are also suitable for execution in the virtual machine, wherein the set of the virtual machine instructions consists of a number of virtual machine instructions which is less than the number of the corresponding Java Bytecode executable instructions, wherein every one of the corresponding Java Bytecode executable instructions can be represented by at least one of the virtual machine instructions in the reduced set of virtual machine instruction set; wherein the set of virtual machine instructions includes at least one virtual machine instruction that represents at least one operation that cannot be represented by any one of the Java Bytecode executable instructions and wherein at least one virtual machine instruction in said set of virtual machines is internally represented in the virtual machine by a code stream and a data stream, wherein the code stream is suitable for containing a code portion of the at least one virtual machine instruction, and wherein the data stream is suitable for containing a data portion of the at least one virtual machine instruction; and computer program code for executing said reduced set of virtual machine instructions.

2. A computer readable medium for storing a set of virtual machine instructions as recited in claim 1, wherein two or more Java Bytecode executable instructions are represented by one virtual machine instruction.

3. A computer readable medium for storing a set of virtual machine instructions as recited in claim 1, wherein at least one of the Java Bytecode executable instructions can be represented by the two or more virtual machine instructions.

4. A computer readable medium for storing a set of virtual machine instructions as recited in claim 3, wherein the least one Java Bytecode executable instruction is a conditional data flow operation.

5. A computer readable medium for storing a set of virtual machine instructions as recited in claim 3, wherein the at least one virtual machine instruction represents a duplicate stack operation.

6. A method of converting a set of Java Bytecode executable instructions into a reduced set of executable virtual machine instructions, the method comprising:

receiving one or more bytes representing a Java Bytecode instruction suitable for execution in a virtual machine;

selecting a corresponding virtual machine instruction, the corresponding virtual machine instruction suitable for execution in the virtual machine and representing one or more operations that can be performed when the Java Bytecode instruction is executed;

wherein every one of the corresponding Java Bytecode executable instructions can be represented by at least one of the virtual machine instructions in the virtual machine instruction set and wherein the set includes at least one virtual machine instruction that represents at least one operation that cannot be represented by any one of the Java Bytecode executable instructions;

loading the corresponding virtual machine instruction into the virtual machine as an Internal representation into a pair of streams, wherein the pair of streams includes a code stream and a data stream, wherein the code stream is suitable for containing a code portion of the at least one virtual machine instruction, and the data team is suitable for containing a data portion of the at least one virtual machine instruction; and wherein the virtual machine instruction can represent at least two or more Java Bytecode executable instructions such that operations that can be performed by executing the at least two or more Java Bytecode executable instructions can be performed by execution of the virtual machine instruction.

7. A computer readable medium including computer program code for executing Java Bytecode instructions, said computer readable medium comprising:

computer program code for a Java Bytecode instruction translator operating to convert a set of Java Bytecode executable instructions suitable for execution on a virtual machine into a reduced set of corresponding executable virtual machine instructions, wherein the corresponding virtual machine instructions are also suitable for execution in the virtual machine and represent operations that can be performed by execution of a number of corresponding Java Bytecode instructions, wherein the corresponding set of the virtual machine instructions consists of a number of virtual machine instructions that is less than the number of the corresponding Java Bytecode executable instructions, wherein every one of the Java Bytecode instructions can be represented by at least one of the corresponding executable virtual machine instructions in the virtual machine instruction set;

wherein at least one virtual machine instruction represents an operation that cannot be represented by any one of the Java Bytecode executable instructions; and wherein at least one virtual machine instruction is internally represented in the virtual machine by a pair of streams, wherein the code stream is suitable for containing a code portion of the at least one virtual machine instruction, and wherein the data stream is suitable for containing a data portion of the at least one virtual machine instruction; and computer program code for executing said reduced set of corresponding executable virtual machine instructions after said Java Bytecode instruction translator operates to convert a set of Java Bytecode executable instructions.

8. A computer readable medium for storing a set Java Bytecode instruction translator as recited in claim 7, wherein the least one Java Bytecode executable instruction is a conditional data flow operation.

9. A computer readable medium for storing a set Java Bytecode instruction translator as recited in claim 7, wherein the at least one virtual machine instruction represents a duplicate stack operation.

10. A computer readable medium including computer program code for executing virtual machine instructions, said computer readable medium comprising:

computer program code for a reduced-set of virtual machine instructions suitable for execution by a virtual machine, wherein the reduced-set of virtual machine instructions includes a first plurality of virtual machine instructions that collectively represent a complete-set of virtual machine instructions which can be used to implement said virtual machine, wherein said virtual machine may also be implemented by a larger-set of virtual machine instructions including a second plurality of virtual machine instructions that collectively represent another complete-set of virtual machine instructions which also can be used to implement said virtual machine, wherein the number of virtual machine instructions in said first plurality of virtual machines instructions of said reduced-set Is less than the number of instructions in said second plurality of virtual machines instructions in said larger-set; and computer program code for executing the reduced-set of virtual machine instructions.

11. A computer readable medium as recited in claim 10, wherein said reduced-set includes at least one virtual machine instruction which implements a functionality which is not provided by any of the virtual machine instructions in said larger-set.

12. A computer readable medium as recited in claim 11, wherein said virtual machine includes a code stream and a data stream, and wherein the code stream is designated for storing the code associated with virtual machine instructions in said reduced-set of virtual machines instructions and the data stream is designated for string the code associated with virtual machine instructions in said reduced-set of virtual machines instructions.

13. A computer readable medium as recited in claim 10, wherein said reduced-set includes: a push, a load, a store, a dup, a return, and a new instruction.

14. A computer system, comprising:

at least one processor that supports a virtual machine, wherein said virtual machine receives and executes at least one instruction from a reduced-set of virtual machine instructions, wherein said reduced-set of virtual machine instructions includes a first plurality of virtual machine instructions that collectively represent a complete-set of virtual machine instructions used to implement said virtual machine, wherein said virtual machine may also be implemented by a larger-set of virtual machine instructions including a second plurality of virtual machine instructions that collectively represent another complete-set of virtual machine instructions which also can be used to implement said virtual machine, wherein the number of virtual machine instructions in said first plurality of virtual machines instructions of said reduced-set is less than the number of instructions in said second plurality of virtual machines instructions in said larger-set.

15. A computer system as recited in claim 14, wherein said reduced-set includes: a push, a load, a store, a dup, a return, and a new instruction.

16. A virtual machine embodied in a computer readable media, the virtual machine being compatible with a defined virtual machine specification that includes a defined set of executable virtual machine instructions that must be implemented to conform with the virtual machine specification, wherein the virtual machine receives and executes a reduced set of virtual machine instructions that provide substantially all of the functionality provided by the defined virtual machine instruction set, and wherein every one of the instructions in the defined set of executable instructions can be represented by at least one of the virtual machine instructions in the reduced virtual machine instruction set, and wherein the reduced set of virtual machine instructions consists of a number of virtual machine instructions which is less than the number executable virtual machine instructions in the defined virtual machine instruction set.

17. A virtual machine as recited in claim 16, wherein said reduced-set includes: a push, a load, a store, a dup, a return, and a new instruction.

18. A virtual machine as recited in claim 16, wherein said reduced-set of virtual machine instructions includes at least one virtual machine instruction that represents at least one operation that cannot be represented by any one of the Java Bytecode executable instructions.

19. A virtual machine as recited in claim 16, wherein said reduced-set includes at least one virtual machine instruction which implements a functionality which is not provided by any of the virtual machine instructions in said larger-set.

20. A method for executing a first stream of Bytecodes that include virtual machine instructions that are compliant with a defined-set of virtual machine instructions that are defined by a virtual machine specification into a reduced set representation of Bytecodes that include only virtual machine instructions that are part of a reduced-set of virtual machine instructions, wherein the reduced-set of virtual machine instructions provide substantially all of the functionality provided by the defined virtual machine instruction set and the number of virtual machine instructions in the reduced set of virtual machine instructions is less than the number of virtual instructions in the defined set of virtual machine instructions, the method comprising:

- receiving a first stream of Bytecodes that include a first plurality of virtual machine instructions, wherein all of the virtual machine instructions in the first stream of Bytecodes are included in and compliant with the defined virtual machine instructions set;
- translating the first plurality of virtual machine instructions into a second plurality of virtual machine instructions, wherein all of the second plurality of virtual machine instructions are included in and compliant with the reduced virtual machine instruction set; and
- executing the second plurality of virtual machine instructions after said translating of the first plurality of virtual machine instructions.

* * * * *